US011817122B1

(12) United States Patent
Nakagawa et al.

(10) Patent No.: US 11,817,122 B1
(45) Date of Patent: Nov. 14, 2023

(54) DATA STORAGE DEVICE WITH NOTCH FILTER CALIBRATION BASED ON MULTI-RATE EXCITATION AND ERROR REJECTION

(71) Applicant: WESTERN DIGITAL TECHNOLOGIES, INC., San Jose, CA (US)

(72) Inventors: Shinsuke Nakagawa, Tsuchiura (JP); Zaifeng Chen, Rancho Palos Verdes, CA (US); Hidehiko Numasato, Hiratsuka (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/895,640

(22) Filed: Aug. 25, 2022

(51) Int. Cl.
*G11B 20/10* (2006.01)
*G11B 21/03* (2006.01)
*G11B 25/04* (2006.01)

(52) U.S. Cl.
CPC ........ *G11B 20/10388* (2013.01); *G11B 21/03* (2013.01); *G11B 25/04* (2013.01)

(58) Field of Classification Search
None
See application file for complete search history.

(56) References Cited

U.S. PATENT DOCUMENTS

| 5,325,247 | A | | 6/1994 | Ehrlich et al. |
| 5,768,228 | A | * | 6/1998 | Bates ................. G11B 7/08529 |
| | | | | 369/44.29 |
| 5,774,298 | A | * | 6/1998 | Cheung .............. G11B 5/59622 |
| | | | | 360/77.08 |

(Continued)

FOREIGN PATENT DOCUMENTS

EP 1463035 A1 9/2004

OTHER PUBLICATIONS

Zheng, Minghui—Advanced Learning, Estimation and Control in High-Precision Systems; UC Berkeley Electronic Theses and Dissertations—Publication Date 2017; 120 pages https://escholarship.org/content/qt9zk4q44r/qt9zk4q44r.pdf.

(Continued)

*Primary Examiner* — Peter Vincent Agustin
(74) *Attorney, Agent, or Firm* — CALDERON, SAFRAN & COLE PC

(57) ABSTRACT

Various illustrative aspects are directed to a data storage device, comprising one or more disks; an actuator mechanism configured to position one or more heads proximate to one or more disk surfaces of the one or more disks; and one or more processing devices, comprising an actuator mechanism control system configured for controlling the actuator mechanism. The processing devices are configured to: apply coefficients for a multi-rate notch filter to a servo control loop; measure a multi-rate error rejection transfer function; determine whether a peak of the multi-rate error rejection transfer function is greater than a multi-rate error rejection (Continued)

transfer function threshold; and modify, responsively to determining that the peak of the multi-rate error rejection transfer function is not greater than the multi-rate error rejection transfer function threshold, the parameters of the multi-rate notch filter based at least in part on the peak of the multi-rate error rejection transfer function.

20 Claims, 10 Drawing Sheets

(56) References Cited

U.S. PATENT DOCUMENTS

| | | | |
|---|---|---|---|
| 6,122,125 A | | 9/2000 | Clare et al. |
| 6,219,196 B1* | | 4/2001 | Semba ................ G11B 5/596 |
| | | | 318/560 |
| 6,417,982 B1* | | 7/2002 | Ottesen ............... G11B 5/5526 |
| | | | 360/77.02 |
| 6,643,080 B1 | | 11/2003 | Goodner, III et al. |
| 7,864,482 B1 | | 1/2011 | Babinski et al. |
| 8,392,000 B2 | | 3/2013 | Levin et al. |
| 8,804,265 B2 | | 8/2014 | Otaguro et al. |
| 10,366,718 B1* | | 7/2019 | Supino ............... G11B 5/59627 |
| 10,629,234 B1* | | 4/2020 | Guo ..................... G06F 17/17 |
| 2002/0131342 A1 | | 9/2002 | Kadlec et al. |
| 2004/0212913 A1* | | 10/2004 | Jung ................... G11B 5/5521 |
| | | | 360/77.02 |
| 2005/0111125 A1* | | 5/2005 | Chung ................. G11B 19/04 |
| 2007/0019321 A1* | | 1/2007 | Kim ..................... G11B 5/5582 |
| | | | 360/78.04 |
| 2007/0241711 A1 | | 10/2007 | Finamore et al. |
| 2008/0224792 A1 | | 9/2008 | Nielson |
| 2009/0219641 A1 | | 9/2009 | Harmer |
| 2011/0058276 A1* | | 3/2011 | Uchida ............. G11B 5/59622 |
| 2014/0063652 A1 | | 3/2014 | Otani |
| 2020/0133226 A1* | | 4/2020 | Tsuneki ................ G06N 3/006 |

OTHER PUBLICATIONS

Atsumi et al.—Vibration Control Above the Nyquist Frequency in Hard Disk Drives, IEEE Transactions on Industrial Electronics, vol. 55, No. 10, Oct. 2008; pp. 3751-3757; 7 pages https://www.researchgate.net/publication/224332117_Vibration_Control_Above_the_Nyquist_Frequency_in_Hard_Disk_Drives.

Cao et al.—Servo Systems Using Multi-rate Notch Filters To Attenuate Resonances Beyond Nyquist Rate; IEEE Dec. 5-8, 2006, ISBN:1-4244-0341-3; 6 pages https://ieeexplore.ieee.org/abstract/document/4150376.

Kang et al—An adaptive notch filter for suppressing mechanical resonance in high track density disk drives; Microsyst Technol; May 19, 2005; 11: 638-652; 15 pages https://www.researchgate.net/publication/227150626_An_adaptive_notch_filter_for_suppressing_mechanical_resonance_in_high_track_density_disk_drives.

Yan et al.—Multirate adaptive control of uncertain resonances beyond the Nyquist frequency in high-performance mechatronic systems; ScienceDirect—Automatica vol. 66, Issue C (Apr. 2016) 63-72; 10 pages https://dl.acm.org/doi/10.1016/j.automatica.2015.12.018.

Atsumi—Disturbance suppression beyond Nyquist frequency in hard disk drives; Proceedings of the 17th World Congress The International Federation of Automatic Control, Seoul, Korea, Jul. 6-11, 2008; 6 pages https://folk.ntnu.no/skoge/prost/proceedings/ifac2008/data/papers/0448.pdf.

Weaver et al., "The Use Of Multirate Notch Filters In Embedded-Servo Disk Drives," Jun. 1995, Proceedings of the American Control Conference, pp. 4156-4160. (Year: 1995).

* cited by examiner

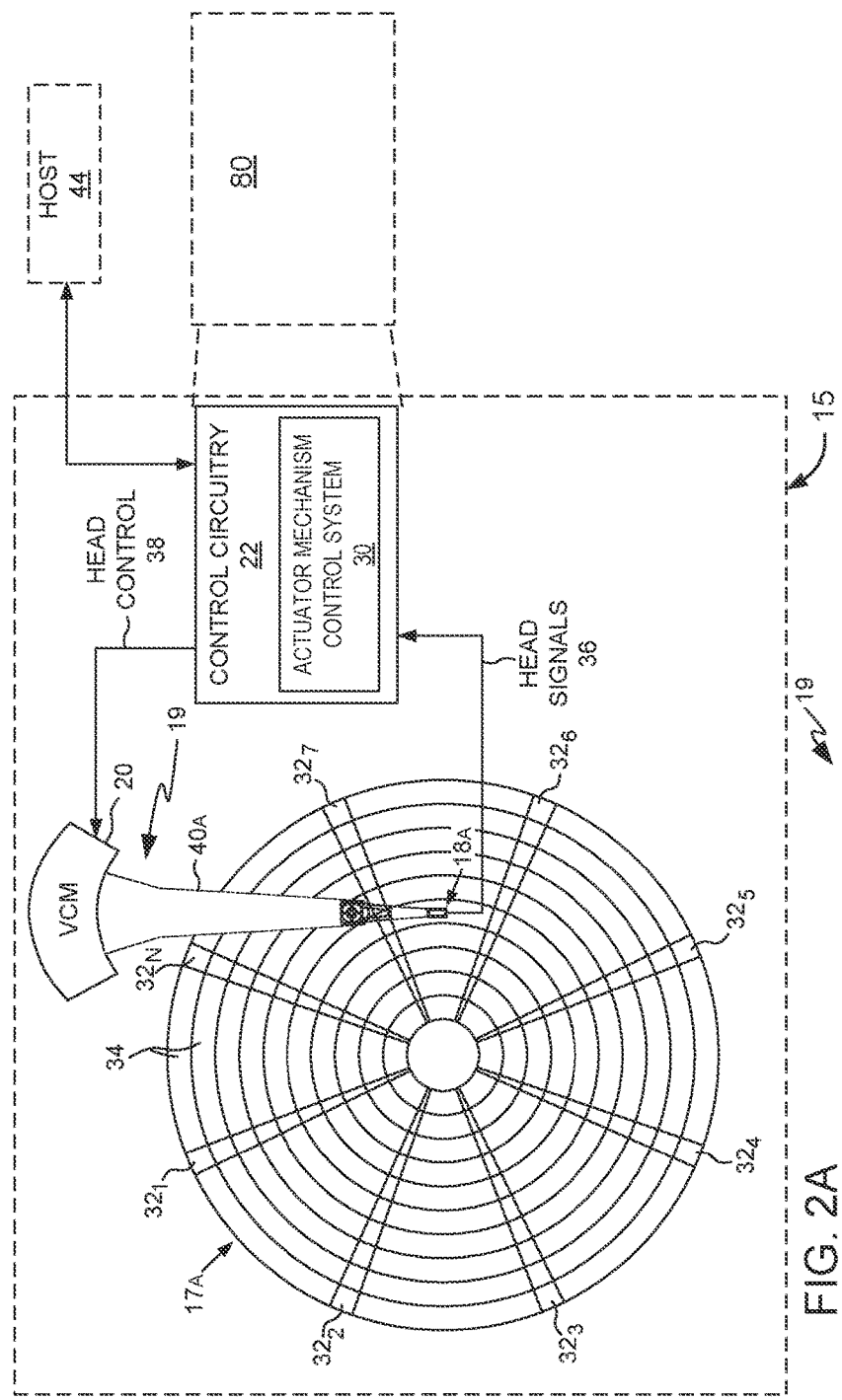
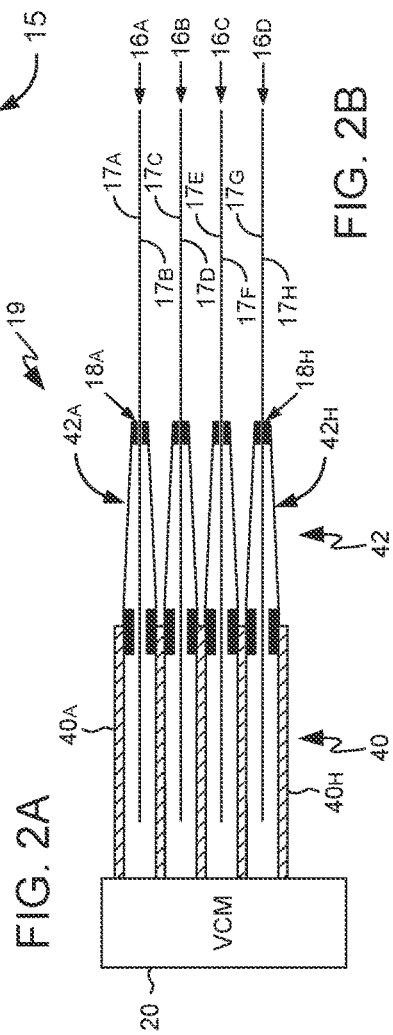

DATA STORAGE DEVICE WITH NOTCH FILTER CALIBRATION BASED ON MULTI-RATE EXCITATION AND ERROR REJECTION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges 60-6N recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 6$i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with control circuitry that may calibrate a notch filter based on a generated multi-rate excitation. In various examples, control circuitry may inject a multi-rate excitation to an actuator control system (single actuator or multi-actuator), identify a resonance frequency in response to the multi-rate excitation, and use the detected resonance frequency in response to the multi-rate excitation to calibrate an error rejection transfer function (ETF) peak detection, including for multi-rate error rejection transfer function (mrETF). This may include detecting a true resonance frequency beyond a Nyquist frequency of the system, distinguished from an aliased frequency response below the Nyquist frequency. Hard disk drive control circuitry in examples of this disclosure may enable applying a notch filter that is custom-calibrated for the particular disk drive, thereby enhancing fine control of an actuator system, promoting high data density, and preventing instability in the servo control loop, among other advantages.

Various illustrative aspects are directed to a data storage device, comprising one or more disks; an actuator mechanism configured to position one or more heads proximate to one or more disk surfaces of the one or more disks; and one or more processing devices, comprising an actuator mechanism control system configured for controlling the actuator mechanism. The one or more processing devices are configured to: apply coefficients for a multi-rate notch filter to a servo control loop; measure a multi-rate error rejection transfer function; determine whether a peak of the multi-rate error rejection transfer function is greater than a multi-rate error rejection transfer function threshold; and modify, responsively to determining that the peak of the multi-rate error rejection transfer function is not greater than the multi-rate error rejection transfer function threshold, the parameters of the multi-rate notch filter based at least in part on the peak of the multi-rate error rejection transfer function.

Various illustrative aspects are directed to a method. The method comprises applying, by the one or more processing devices, coefficients for the multi-rate notch filter to a servo control loop. The method further comprises measuring, by the one or more processing devices, a multi-rate error rejection transfer function. The method further comprises determining, by the one or more processing devices, whether a peak of the multi-rate error rejection transfer function is greater than a multi-rate error rejection transfer function threshold. The method further comprises modifying, by the one or more processing devices, responsively to determining that the peak of the multi-rate error rejection transfer function is not greater than a multi-rate error rejection transfer function threshold, the parameters of the multi-rate notch filter based at least in part on the peak of the multi-rate error rejection transfer function.

Various illustrative aspects are directed to one or more processing devices comprising means for means for receiving parameters of a multi-rate notch filter. The one or more processing devices further comprise means for determining coefficients for the multi-rate notch filter, based at least in part on the parameters of the multi-rate notch filter. The one or more processing devices further comprise means for applying the coefficients for the multi-rate notch filter to a servo control loop. The one or more processing devices further comprise means for measuring a multi-rate error rejection transfer function. The one or more processing devices further comprise means for determining whether a peak of the multi-rate error rejection transfer function is greater than a multi-rate error rejection transfer function threshold. The one or more processing devices further comprise means for modifying, responsively to determining that the peak of the multi-rate error rejection transfer function is not greater than a multi-rate error rejection transfer function threshold, the parameters of the multi-rate notch filter based at least in part on the peak of the multi-rate error rejection transfer function, thereby modifying the peak of the multi-rate error rejection transfer function to be not greater than the multi-rate error rejection transfer function threshold.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

DETAILED DESCRIPTION

Figure 1:
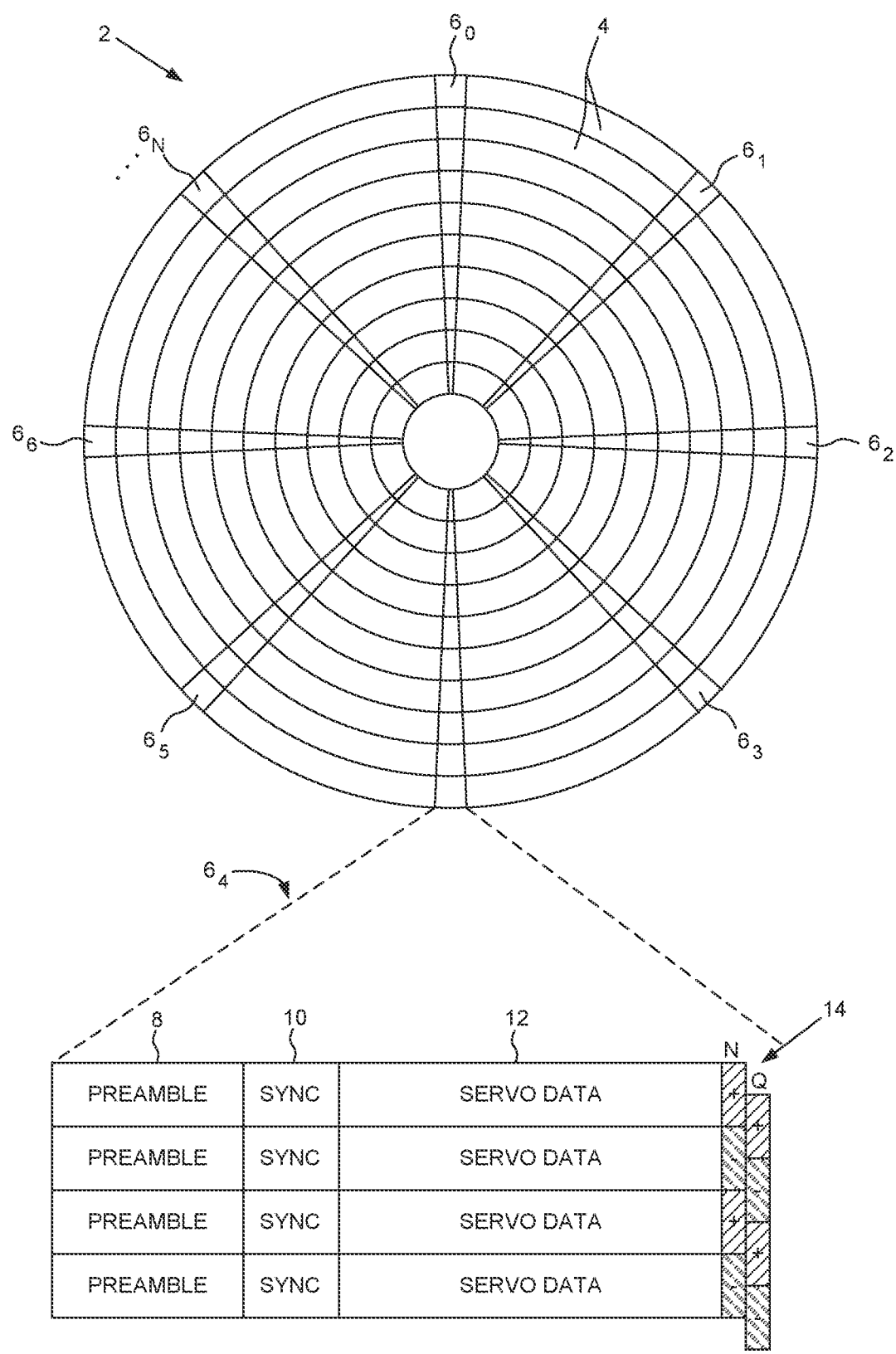
FIG. 1 shows a prior art disk format as comprising a number of radially-spaced, concentric servo tracks defined by servo wedges recorded around the circumference of each servo track.
Figure 2C:
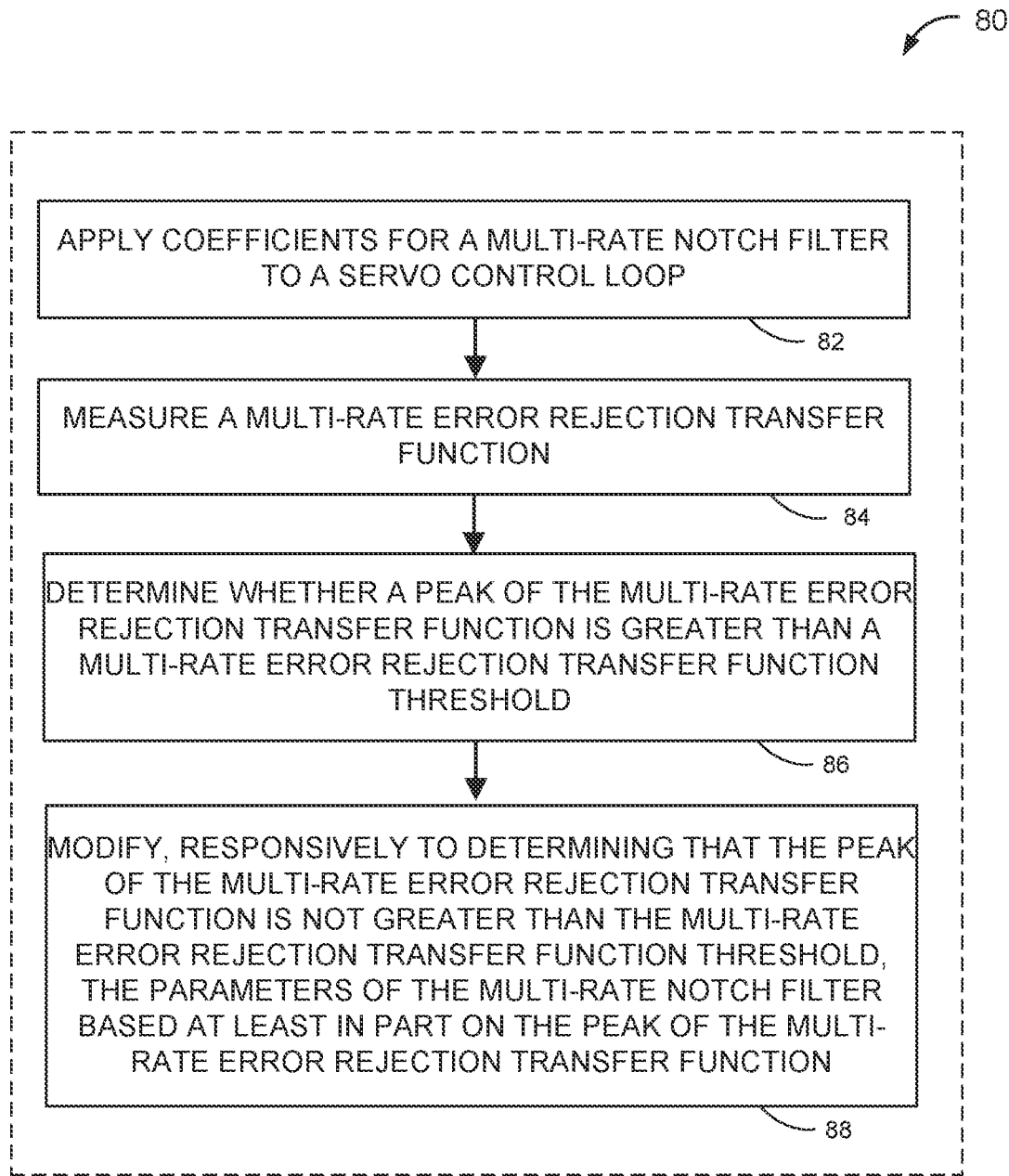
FIG. 2C depicts a flowchart for an example method that control circuitry of a disk drive may perform or execute in controlling the operations of the disk drive, including for calibrating at least one multi-rate notch filter of the actuator mechanism control system based at least in part on a detected frequency response of the actuator mechanism, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that control circuitry 22 of disk drive 15 may perform or execute in controlling the operations of disk drive 15, in accordance with aspects of the present disclosure, including operations involved in outputting a multi-rate excitation to a multi-rate notch filter of an actuator control system, and detecting a multi-rate resonance frequency response of one or more actuators controlled by the actuator control system in response to the multi-rate excitation. Control circuitry 22 may perform such operations for calibrating a multi-rate notch filter of the actuator control system based at least in part on the detected mechanical resonance frequency response of the actuator, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend one of read/write heads 18 ("heads 18") in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example. Actuator arm assembly 19, including its one or more actuators, thus form an actuator mechanism configured to position one or more heads proximate to one or more disk surfaces of the one or more disks, in accordance with various examples.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 321-32N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 321-32N and generate a position error signal (PES) representing an error between the actual position of the head and a target position relative to a target track. A servo control system, or actuator mechanism control system 30, in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples.

Control circuitry 22 comprises an actuator mechanism control system 30 configured for controlling the actuator mechanism. Actuator mechanism control system 30 may comprise, be comprised in, or be otherwise related to a servo control system. In executing example method 80 of FIG. 2C (aspects of which will also be further explained below with reference to the further figures), actuator mechanism control system 30 and/or other elements of control circuitry 22 may be configured to issue one or more commands to other components of disk drive 15, receive information from one or more other components of disk drive 15, and/or perform one or more internal operations, such as generating one or more driver currents for outputting to system components of disk drive 15. In particular, control circuitry 22 may apply coefficients for a multi-rate notch filter to a servo control loop (82). Control circuitry 22 may receive parameters of the multi-rate notch filter, and determine the coefficients for the multi-rate notch filter, based at least in part on the parameters of the multi-rate notch filter, prior to applying the coefficients for the multi-rate notch filter to the servo control loop, in various examples. Control circuitry 22 may measure a multi-rate error rejection transfer function (84). Control circuitry 22 may determine whether a peak of the multi-rate error rejection transfer function is greater than a multi-rate error rejection transfer function threshold (86). Control circuitry 22 may further modify, responsively to determining that the peak of the multi-rate error rejection transfer function is not greater than the multi-rate error rejection transfer function threshold, the parameters of the multi-rate notch filter based at least in part on the peak of the multi-rate error rejection transfer function (88). Control circuitry 22 modifying the parameters of the multi-rate notch filter based at least in part on the peak of the multi-rate error rejection transfer function may comprise control circuitry 22 modifying the peak of the multi-rate error rejection transfer function to be not greater than the multi-rate error rejection transfer function threshold, in various examples. Control circuitry 22 may further store, responsively to the peak of the multi-rate error rejection transfer function being not greater than the multi-rate error rejection transfer function threshold, the modified parameters of the multi-rate notch filter, in various examples. Control circuitry 22 may further perform additional actions, methods, and techniques, in accordance with various aspects including as further described herein.

Disk drive control circuitry 22 processes one or more read signals from one or more heads to demodulate servo sector signals into a position error signal (PES). The actuator mechanism control system 30 of the disk drive control circuitry 22 comprises at least one compensation filter and at least one notch filter which filter the PES as part of generating an actuator control signal (single actuator or multi-actuator control signal), which may include at least a VCM control signal to apply to at least one VCM, and thereby rotate an actuator arm assembly about a pivot in order to position the one or more heads radially over one or more disks in a direction that reduces the PES. A disk drive that uses one or more fine actuators, such as a milliactuators and/or a microactuator, in addition to a VCM, may have additional complexity in its resonance frequencies and in its need to filter out such resonance frequencies.

A notch filter attenuates one or more resonance frequency peaks of the servo system. The notch filter may be calibrated, such as in an initial notch filter calibration during the manufacturing process, and at other times, such as in an in-field notch filter calibration update process, in various examples. Calibration may be useful to address and filter the actual one or more resonant frequencies of an individual drive, which can have individual variations per individual disk drive due to sensitive dependencies of mechanical resonance frequencies on minor but realistic deviations in an individual end product of a manufacturing process from the precise specifications and ideals of an engineering design. The control circuitry may ideally calibrate the notch filter to attenuate away the resonant frequencies while otherwise affecting the PES as little as possible, to maximize the useful PES, which may thereby maximize the precision achieved with the heads on the disk surfaces and maximize the data density achieved, the data input/output speed, and/or other performance characteristics.

Notch filter calibration performance may be measured with a quality metric defined with reference to a gain of an error rejection transfer function (ETF) for tracking a target track. The maximum peak gain of the error rejection transfer function for tracking the target track may be indicative of a maximum quality for the notch filter calibration. The error rejection transfer function may be defined in terms of the frequency response that works to attenuate tracking error to a command input, such as may be measured in decibels per kilohertz, for example. A hard disk drive has an inherent limit on the sampling frequency of the PES, defined by the density of servo sectors. This inherent limit on the sampling frequency of the PES carries with it an inherent Nyquist frequency, equal to one-half the sampling frequency, and thus inherent aliasing effects. Such inherent aliasing effects inherently may potentially confuse conventional frequency detection, and cause an alias frequency below the Nyquist frequency to be detected, instead of a true resonance frequency above the Nyquist frequency, which aliases to the detected alias frequency. This confused detection of an alias frequency tends to be especially an issue in systems incorporating fine actuators (e.g., milliactuators and/or microactuators), which may, by their nature (e.g., smaller dimensions, lower mass, lower structural strength and rigidity), inherently have resonant frequencies substantially higher than resonant frequencies for the primary actuator, and much higher relative to the sampling frequency of the PES and thus relative to the Nyquist frequency.

Methods, systems, and devices of this disclosure implement novel resolution of these challenges by enabling directly measuring an ETF peak, including for mrETF, beyond a Nyquist frequency as a quality metric of notch filter rejection performance, and distinguishing a true ETF peak resonance frequency, without confusion caused by aliasing, among other novel advantages. This may be particularly useful in multi-actuator systems that use a VCM as a primary actuator and also use fine actuators, such as milliactuators and/or microactuators, whose components and motions are much smaller and finer and whose resonant frequencies may be significantly higher, and more likely to be above a Nyquist frequency.

A system in accordance with this disclosure enables measuring the ETF peak beyond the Nyquist frequency directly as a quality metric of notch filter rejection performance, in various aspects. In various examples of this disclosure, an actuator mechanism control system may inject a multi-rate sinusoidal wave excitation at a multi-rate notch filter input (or output), and use the resulting excitation noise of the multi-rate sinusoidal wave for control feedback and calibration. The frequency response from the injected multi-rate sinusoidal wave excitation to the signal where the sinusoidal wave is added corresponds to the multi-rate error rejection transfer function ("mrETF") of the frequency beyond the Nyquist frequency. Thus, the mrETF can be used to distinguish an ETF peak due to resonance beyond the Nyquist frequency, and makes it possible to apply a multi-rate notch filter reliably to the actual resonant frequency, regardless of whether it is below or above the Nyquist frequency. A system of this disclosure may thus evaluate the ETF peak by the actual frequency of a resonance beyond the Nyquist frequency as a quality metric of notch filter calibration, and customize the multi-rate notch filter to have its notch frequency adjusted to fit the actual mechanical resonance frequency the actuator mechanism control system of the control circuitry measures in the calibration process, in various examples. Systems of this disclosure may provide further novel advantages, such as improving target to tracking ETF, and reducing non-repeatable runout (NRRO) error, in various examples.

Figure 3:
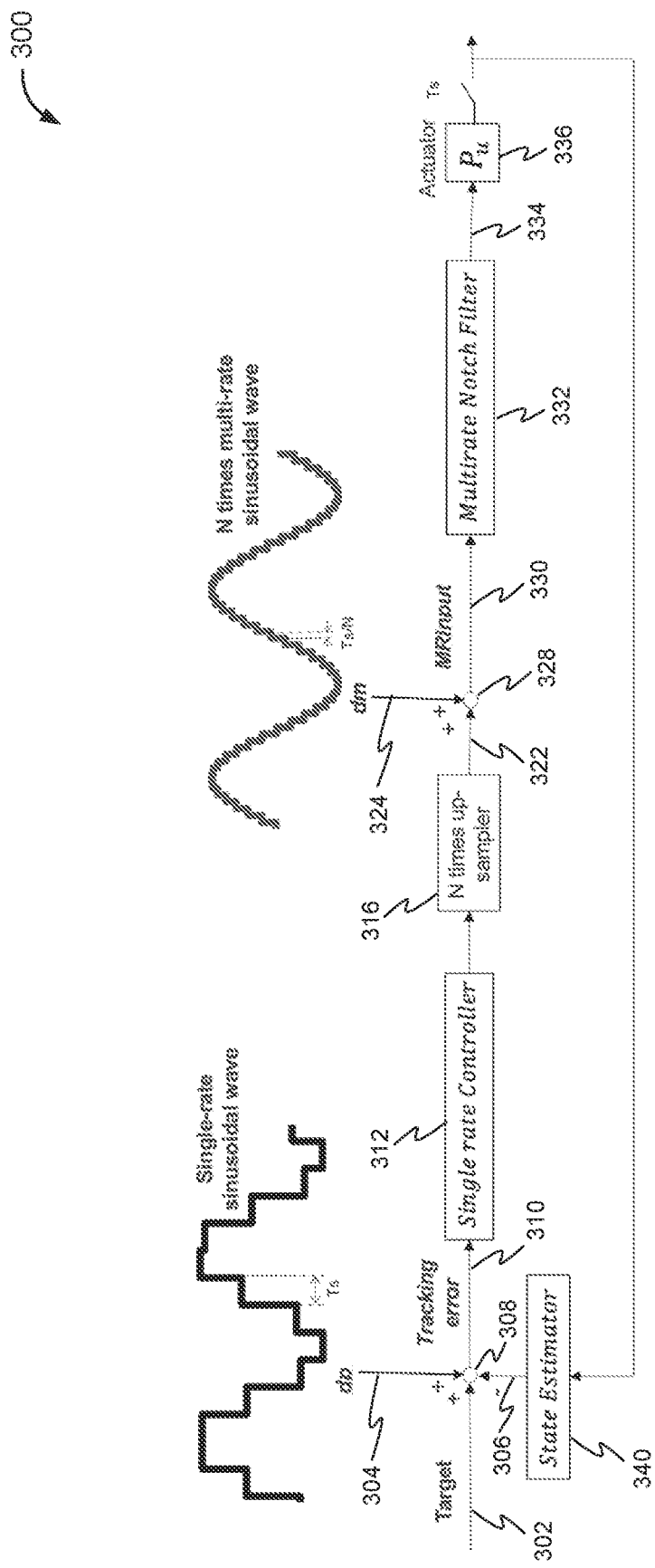
FIG. 3 illustrates a actuator mechanism control system comprising a closed-loop multi-rate error rejection transfer function (mrETF) control system, in accordance with examples of the present disclosure.

FIG. 3 illustrates a actuator mechanism control system 300 comprising a closed-loop multi-rate error rejection transfer function (mrETF) control system, in accordance with examples of the present disclosure. In this example, actuator mechanism control system 300 injects a single-rate sinusoidal wave excitation 304 ($dp$) to summation module 308 to be summed together with the state target signal 302 minus the state estimator output 306 (which incorporates feedback from actuator mechanism 336 via state estimator 340). The resulting output of summation module 308 is a single-rate tracking error 310. Actuator mechanism control system 300 inputs single-rate tracking error 310 to single-rate controller 312, which outputs to N times up-sampler 316, which thereby generates N times up-sampler output 322. Actuator mechanism control system 300 also injects a multi-rate sinusoidal wave excitation 324 ($dm$) to summation module 328 to be summed together with the N times up-sampler output 322, thereby outputting multi-rate compensation filter input 330 (MRinput). There is a single-rate error rejection transfer function (ETF) which is the transfer function from single-rate sinusoidal wave excitation 304 ($dp$) to the single-rate tracking error 310, while the multi-rate error rejection transfer function (mrETF) is the transfer function from multi-rate sinusoidal wave excitation 324 ($dm$) to multi-rate compensation filter input 330 (MRinput). Multi-rate compensation filter input 330 is entered as the input to multi-rate compensation filter 332, which comprises a multi-rate notch filter. Multi-rate compensation filter 332 generates multi-rate actuator control signal 334, which actuator mechanism control system 300 outputs to the actuator mechanism 336, to control actuator mechanism 336.

The frequency response from an injected multi-rate sinusoidal wave excitation 324 ($dm$) to the signal to which the multi-rate sinusoidal wave excitation is added, i.e., N times up-sampler output 322, may correspond to the multi-rate error rejection transfer function (mrETF) of a resonance frequency beyond a Nyquist frequency. Actuator mechanism control system 300 may identify a resonance frequency before starting or as part of calibration of mrETF peak detection. In order to measure the mrETF peak beyond a Nyquist frequency directly as a quality metric of notch filter rejection performance, actuator mechanism control system 300 may inject multi-rate sinusoidal wave excitation 324 at the input of a multi-rate notch filter, e.g., at the input of multi-rate compensation filter 332 comprising a multi-rate notch filter. The frequency response from the injected sinusoidal wave excitation to the signal to which the sinusoidal wave is added (N times up-sampler output 322) may correspond to the error rejection of the frequency beyond the Nyquist frequency (multi-rate ETF or mrETF). Thus, actuator mechanism control system 300 may use the mrETF to distinguish an ETF peak having a frequency beyond the Nyquist frequency, which makes it possible for actuator mechanism control system 300 to calibrate and apply a multi-rate notch filter, e.g., comprised in multi-rate compensation filter 332, to the actual resonant frequency, despite effects of the Nyquist frequency or aliasing.

The multi-rate resonance frequency response of actuator mechanism 336 may thus be based at least in part on or indicative of the multi-rate error rejection transfer function (mrETF). Actuator mechanism control system 300 may output a multi-rate control input to the at least one multi-rate notch filter comprised in the multi-rate compensation filter. The multi-rate control input may be based at least in part on the mrETF, wherein the mrETF is a measure of error transfer from the multi-rate sinusoidal wave excitation 324, and therefore is based at least in part on the multi-rate excitation, in this example. Calibrating the at least one multi-rate notch filter may comprise calibrating based at least in part on the mrETF, as further described below.

The multi-rate control input may be further based at least in part on a closed-loop control signal of the actuator mechanism control system, such as in the form of N times up-sampler output 322, which is summed with the multi-rate excitation 324 to generate the multi-rate compensation filter input 330 (MRinput), which is based on a single-rate excitation 304, in this example. That is, actuator mechanism control system 300 may further be configured to output single-rate excitation 304 to single-rate compensation filter 312 of actuator mechanism control system 300, such that the multi-rate compensation filter input 330 (MRinput), which is based at least in part on the multi-rate excitation 324, is further based at least in part on an output of the single-rate compensation filter 312.

Figure 4:
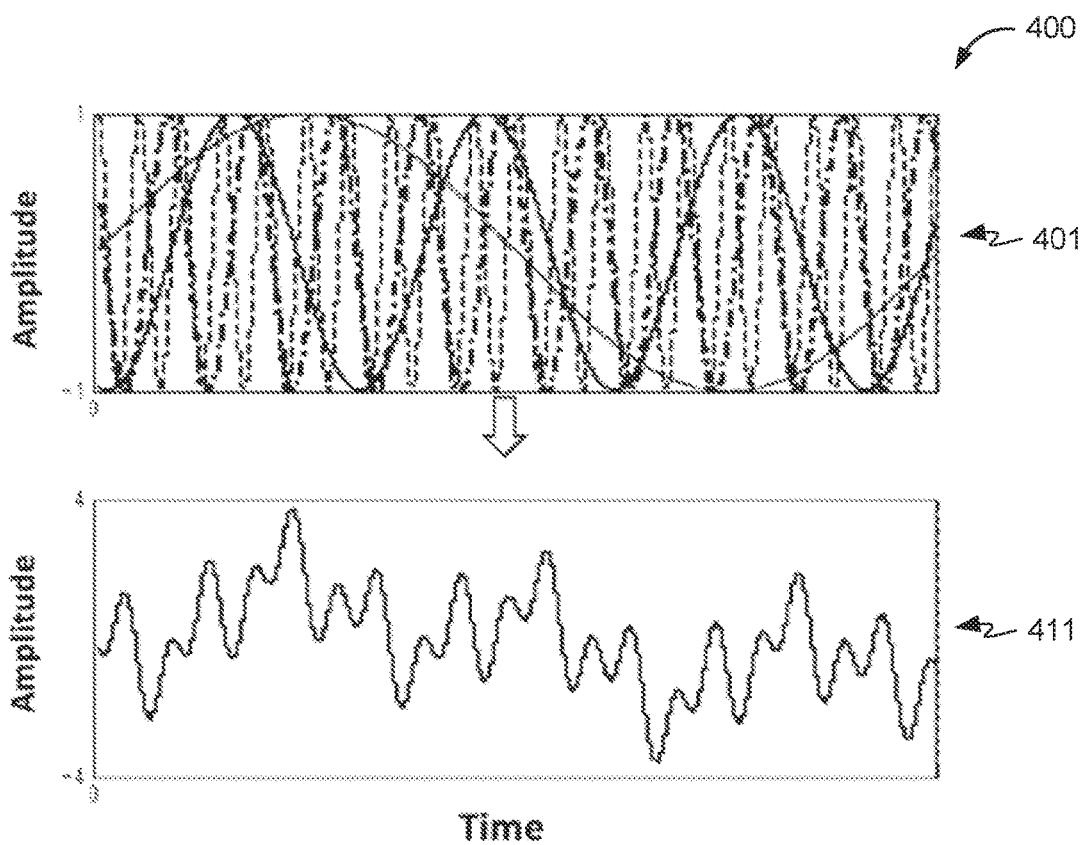
FIG. 4 illustrates a graph illustrating a combination of frequencies for excitation signals that actuator mechanism control system may use to measure and calibrate mrETF, in accordance with examples of the present disclosure.

FIG. 4 illustrates a graph 400 illustrating a combination of frequencies for excitation signals in the form of sinusoidal waves that actuator mechanism control system 300 may use to measure and calibrate mrETF, in accordance with examples of the present disclosure. While FIG. 3 shows a representation of a single sinusoidal wave behind multi-rate sinusoidal wave excitation 324 (*dp*), actuator mechanism control system 300 may generate and superimpose or combine multiple such sinusoidal waves for the multi-rate excitation, as shown in FIG. 4. Actuator mechanism control system 300 may combine any of a wide number of sinusoidal waves (shown at 401) with any of a wide range of frequencies and amplitudes into a total multi-rate excitation, or multi-rate excitation signal (shown at 411), subject to certain constraints, such as avoiding saturating the control system, and avoiding frequencies that alias to a mutually shared, common alias frequency below the Nyquist frequency. Thus, outputting the multi-rate excitation may comprise actuator mechanism control system 300 outputting a plurality of excitations, having a plurality of different frequencies, to the at least one multi-rate notch filter 332 comprised in the multi-rate compensation filter of actuator mechanism control system 300. Actuator mechanism control system 300 outputting a plurality of excitations having a plurality of different frequencies may comprise actuator mechanism control system 300 outputting one or more substantially sinusoidal excitations, in various examples. Actuator mechanism control system 300 may output any of a wide variety of excitations, which may at least be subject to being decomposed into sinusoidal excitations and which may thus form a multi-rate excitation that is equivalent to a plurality of sinusoidal excitations, in various examples.

Actuator mechanism control system 300 may compute the mrETF by performing fast Fourier transforms (FFTs) of multi-rate sinusoidal wave excitation 324 (*dm*) and multi-rate servo control loop response, including multi-rate notch filter input/compensation filter input 330 (MRinput), at the frequencies of multi-rate sinusoidal wave excitation 324. As a result, using multiple frequencies at a measurement may enable reducing the measurement time of the mrETF, in various examples. Actuator mechanism control system 300 may also perform single-frequency injection, in some examples. Actuator mechanism control system 300 may perform Fourier transforms of the multi-rate sinusoidal excitation and the single-rate or multi-rate servo control loop response, in various examples. Actuator mechanism control system 300 may further select amplitudes per frequency for the multi-rate excitation, such that selecting the amplitudes per frequency comprises selecting amplitudes per frequency that avoid causing signal saturation in the actuator mechanism control system.

Figure 5:
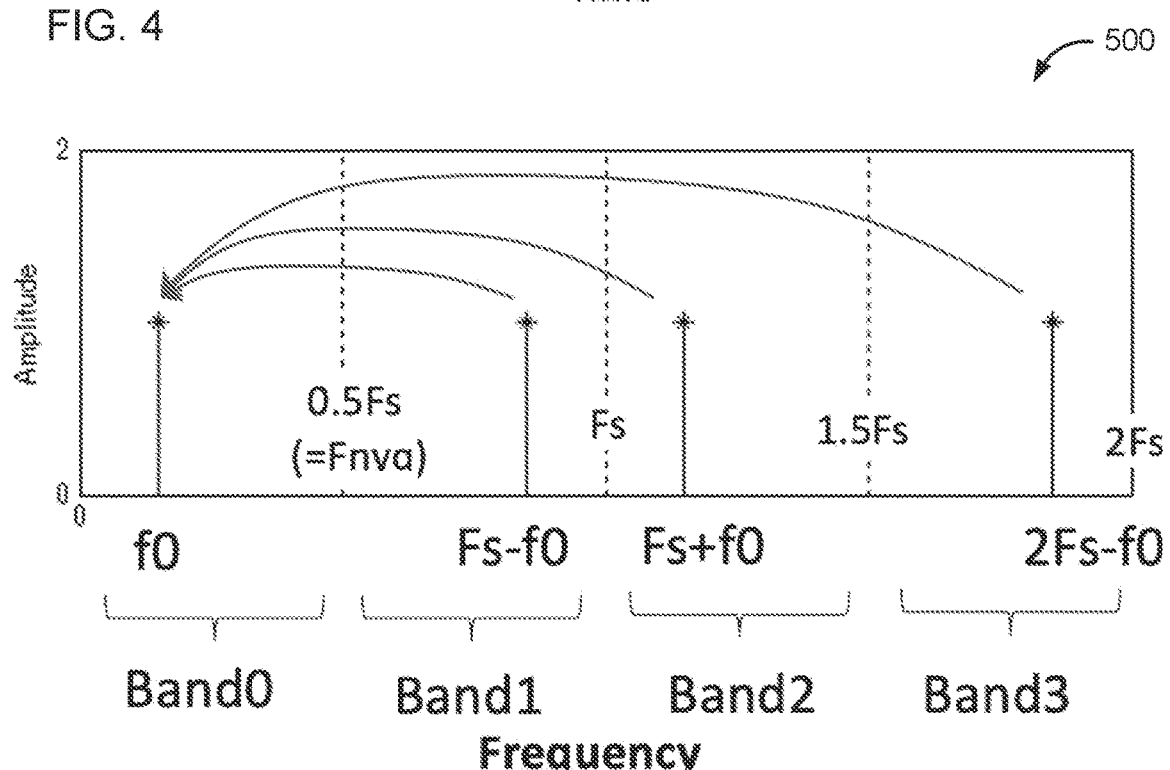
FIG. 5 illustrates a graph illustrating certain relative frequency constraints on excitation signals an actuator mechanism control system may use to measure and calibrate mrETF, in accordance with aspects of the present disclosure.

FIG. 5 illustrates a graph illustrating certain relative frequency constraints on excitation sinusoidal waves an actuator mechanism control system may use to measure and calibrate mrETF, in accordance with examples of the present disclosure. In FIG. 5, the PES sampling frequency is indicated as Fs, and the Nyquist frequency is indicated as Fnyq=0.5 Fs. Band 0 is 0 to 0.5 Fs; Band 1 is 0.5 Fs to Fs; Band 2 is Fs to 1.5 Fs; and Band 3 is 1.5 Fs to 2 Fs, in this example, as depicted in FIG. 5. Actuator mechanism control system 300 may be configured to select a plurality of frequencies for the multi-rate excitation, prior to outputting the multi-rate excitation, wherein selecting the plurality of frequencies for the multi-rate excitation comprises selecting a plurality of frequencies beyond a Nyquist frequency that do not alias to a same, common alias frequency f0 below the Nyquist frequency, i.e., in Band 0. As noted, actuator mechanism control system 300 may select frequencies that are summed up for one measurement, subject to the constraints that the signal amplitude after summation of the multiple sine wave excitations does not cause signal saturation inside actuator mechanism control system 300, and, as shown in FIG. 5, the selected frequencies in bands above the Nyquist frequency (e.g., Band 1, Band 2, Band 3, defined by multiples of the Nyquist frequency, which is one-half of the sampling frequency defined by sampling the servo sectors of the disk surfaces) should not alias to the corresponding alias frequency f0 in Band 0, below the Nyquist frequency.

In some examples, actuator mechanism control system 300 outputting the plurality of excitations having the plurality of different frequencies may comprise actuator mechanism control system 300 outputting excitations having a plurality of frequencies in sequence, and detecting the frequency response of the actuator mechanism may comprise detecting, in sequence, frequency responses of the actuator mechanism to the excitations having the plurality of frequencies. In various examples, actuator mechanism control system 300 outputting the plurality of excitations having the plurality of different frequencies may comprise actuator mechanism control system 300 summing excitations having a plurality of frequencies into a simultaneous multi-rate excitation, as shown in FIG. 4, and outputting the simultaneous multi-rate excitation. Detecting the frequency response of the actuator mechanism may comprise actuator mechanism control system 300 detecting a frequency response, including a multi-rate and/or single-rate frequency response, of the actuator mechanism to the simultaneous multi-rate excitation.

In some examples, detecting the frequency response of the actuator mechanism in response to the multi-rate excitation may comprise determining a multi-rate error rejection transfer function (mrETF) and/or determining a single-rate error rejection transfer function (single-rate ETF) based at least in part on the multi-rate excitation. Determining the mrETF may comprise actuator mechanism control system 300 performing fast Fourier transforms of the multi-rate sinusoidal excitation and the multi-rate notch filter input. Determining the mrETF may also comprise actuator mechanism control system 300 performing single-frequency excitation injection, and performing Fourier transforms of the multi-rate sinusoidal excitation response and single-rate or multi-rate servo control loop response, in various examples.

Figure 6:
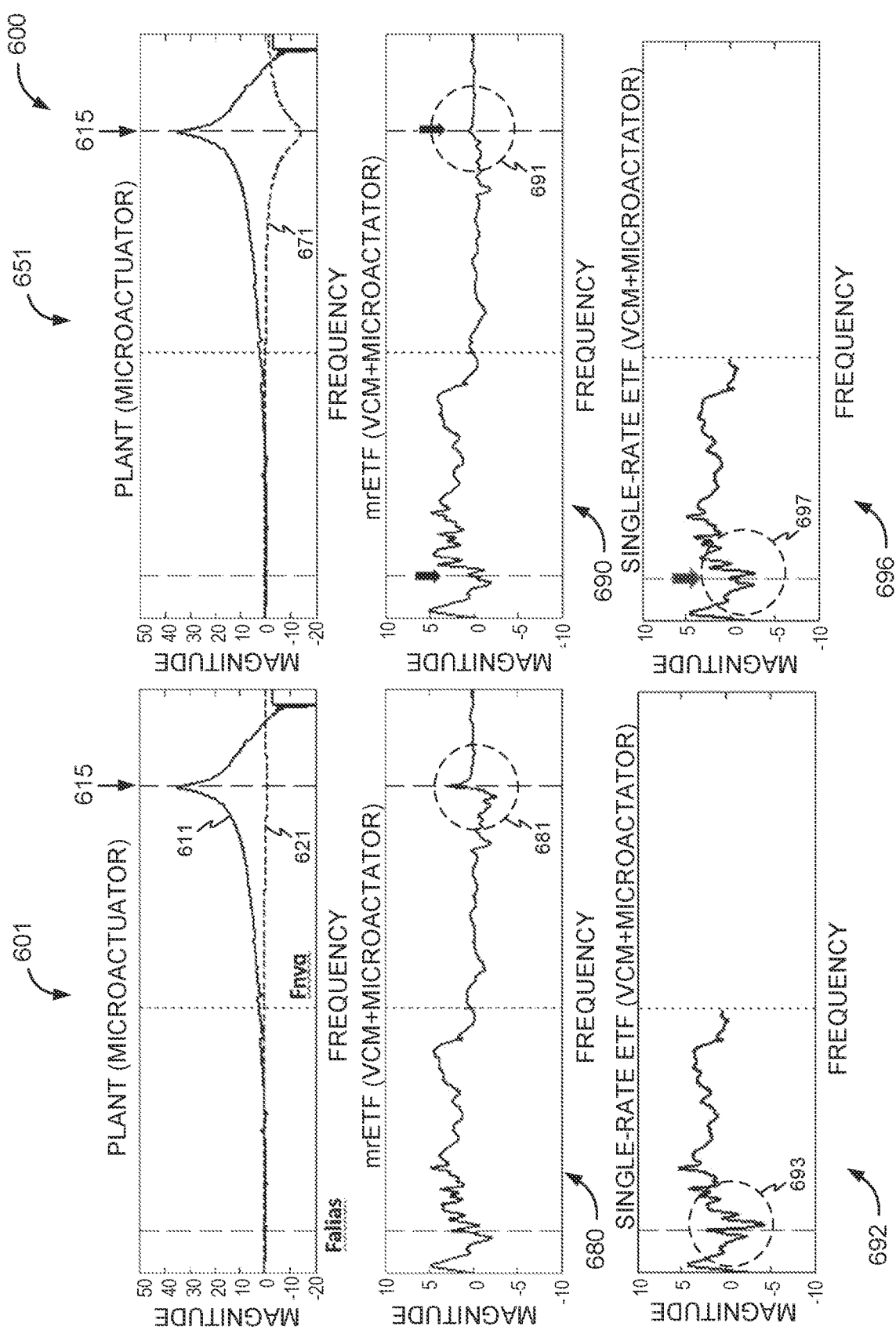
FIG. 6 illustrates a set of graphs illustrating a frequency response of microactuator transfer function, notch filter transfer function, mrETF, and single-rate ETF, all both before and after calibration of the multi-rate notch filter, in accordance with examples of the present disclosure.

FIG. 6 illustrates a set of graphs illustrating a frequency response of microactuator transfer function, notch filter transfer function, mrETF, and single-rate ETF, all both before (at 601) and after (at 651) calibration of the multi-rate notch filter, in accordance with examples of the present disclosure. Graph 601 shows amplitude per frequency 611 of resonance of an example microactuator plant, which rises to a sharp peak at a resonance frequency 615; and amplitude per frequency 621 of filtration by a multi-rate notch filter, prior to calibration, such that the filtration by the multi-rate notch filter is flatly zero across frequencies (prior to calibration). After calibration, based on the mrETF, as shown in graph 651, amplitude per frequency 671 of filtration by the multi-rate notch filter is shaped with negative amplitudes per frequency centered around a filtration peak corresponding with the resonance frequency 615 of the microactuator plant, thereby demonstrating effectiveness of mrETF as a performance metric to serve as a basis for calibrating the notch filter. The resonance frequency of any individual microactuator plant may vary significantly from other individual units of the same design, and from the same manufacturing batch, based on minute physical differences in a finished product; and a process of this disclosure may nevertheless effectively calibrate the microactuator plant based on its own individual detected mrETF. Different microactuators may thus have a variety of different resonant frequencies, and a calibration process in accordance with this disclosure may result in shaping the amplitude per frequency of filtration for a multi-rate notch filter to center on the detected resonance frequency of the individual microactuator in each case.

FIG. 6 also shows mrETF per frequency before calibration (680) and mrETF per frequency after calibration (690), and single-rate ETF per frequency before calibration (692) and single-rate ETF per frequency after calibration (696). As shown in FIG. 6, mrETF per frequency around the resonance frequency (681) prior to calibration suffers from a sharp variation, indicating sharply different multi-rate error rejection transfer function relative to frequency around the resonance frequency. After calibration, however, mrETF per frequency around the resonance frequency (691) is substantially flattened and smoothed out. Similarly, single-rate ETF per frequency around the alias frequency (693) prior to calibration suffers from sharp variations in magnitude per frequency, indicating sharply different single-rate error rejection transfer function relative to frequency around the alias frequency. After calibration, however, single-rate ETF per frequency shows variations in magnitude per frequency substantially reduced around the alias frequency (697). This indicates that an actuator mechanism control system of this disclosure may achieve substantially more reliable error rejection transfer across frequencies, in both mrETF and single-rate ETF, after being calibrated in accordance with techniques this disclosure, in this example.

Figure 7:
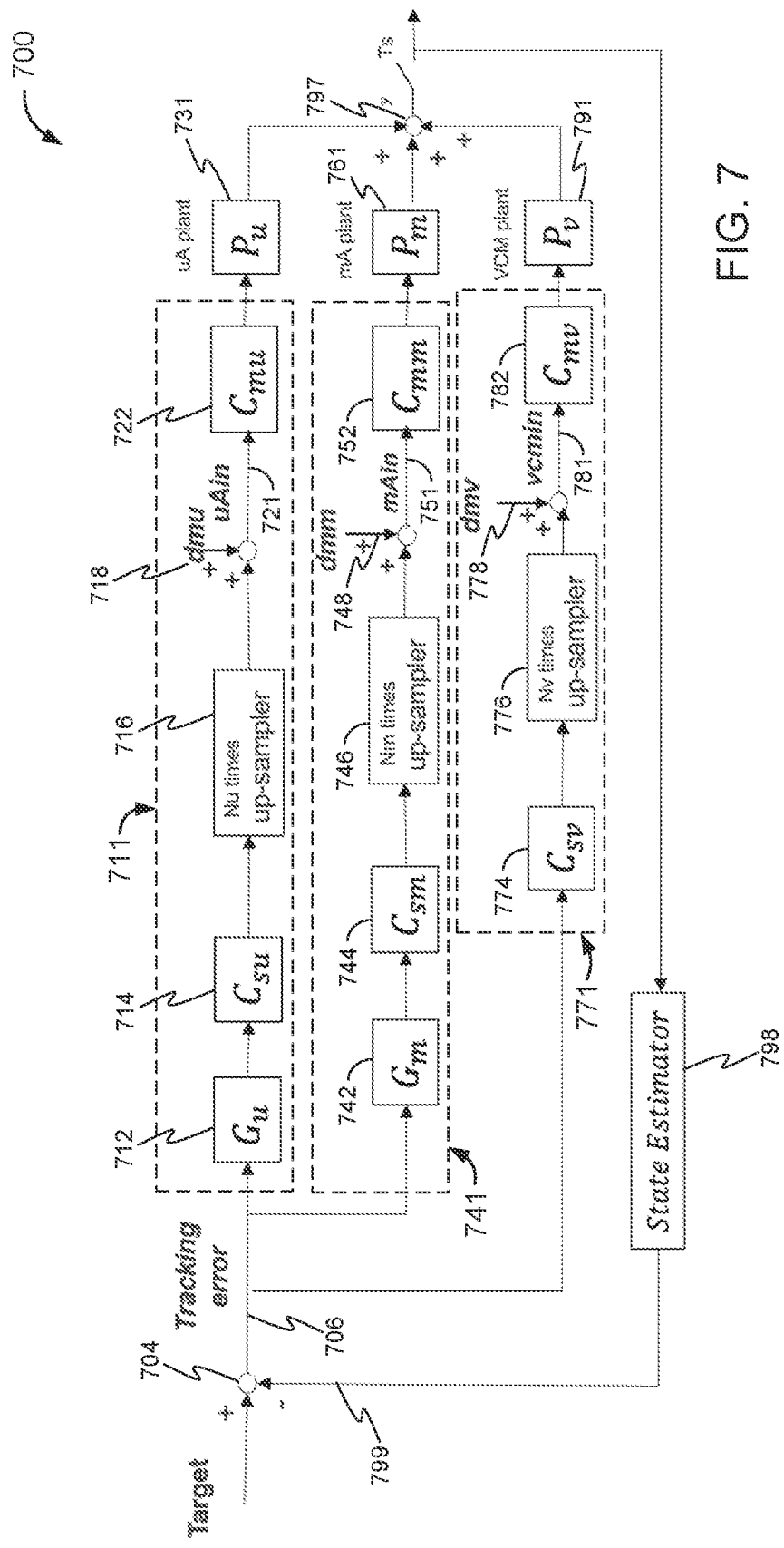
FIG. 7 illustrates a coupled closed-loop multi-actuator track following control system, for controlling multiple actuators including a primary actuator (e.g., VCM), a milliactuator, and a microactuator, in accordance with examples of the present disclosure.

FIG. 7 illustrates a coupled closed-loop multi-actuator track following control system 700, for controlling multiple actuators including a primary actuator 791 (e.g., VCM), a milliactuator 761, and a microactuator 731, in accordance with examples of the present disclosure. Closed-loop multi-actuator track following control system 700 thus serves as an actuator mechanism control system for a system with three types of actuators: a primary actuator 791, a milliactuator 761, and a microactuator 731. Closed-loop multi-actuator track following control system 700 comprises an actuator control subsystem for each of the three actuator types: a primary actuator control subsystem 771, a milliactuator control subsystem 741, and a microactuator control subsystem 711.

The microactuator control subsystem 711 and the milliactuator control subsystem 741 each includes a respective gain circuit, i.e., microactuator gain circuit 712 and milliactuator gain circuit 742. The actuator control subsystems for each of the actuators respectively comprise a single-rate compensation filter 714, 744, 744 ($C_{s*}$), an N times up-sampler 716, 746, 776, a summation module receiving and summing the N times up-sampler output and a respective multi-rate excitation 718, 748, 778, with each respective multi-rate excitation being subject to a respective actuator-specific mrETF, thereby generating a respective actuator-specific multi-rate compensation filter input 721, 751, 781; and a respective multi-rate compensation filter 722, 752, 782 including multi-rate notch filter ($C_m$). Each respective multi-rate compensation filter 722, 752, 782 receives the respective multi-rate compensation filter input 721, 751, 781, and generates a respective actuator control output, which the respective multi-rate compensation filter 722, 752, 782 outputs to the respective actuator 731, 761, 791.

In various examples, the at least one multi-rate notch filter is comprised in a multi-rate compensation filter, e.g., multi-rate compensation filters 722, 752, 782. Because each multi-rate compensation filter 722, 752, 782 comprises a multi-rate notch filter, each of multi-rate compensation filters 722, 752, 782 may interchangeably be referred to as a multi-rate notch filter for purposes herein, with the understanding that each of multi-rate compensation filters 722, 752, 782 is a multi-rate compensation filter that comprises a multi-rate notch filter, which may be calibrated by methods, processes, techniques, devices, and systems of this disclosure.

The resulting performance responses including excitation responses of all three of the actuator types 731, 761 791 may be summed by a summation module 797 and outputted to a state estimator 798. The state estimator 798 may output a state estimator output 799 to a summation module 704 with the control target input 701 in a feedback loop for generating a common, shared tracking error 706 used as the input to each of the actuator control subsystems 711, 741, 771 for each of the actuators 731, 761, 791, in this example.

The gain circuits 712, 742 (Gu, Gm) for the microactuator 731 and the milliactuator 761 may be set either on, or to zero, to either activate or deactivate controls for the microactuator 731 and the milliactuator 761. If neither the microactuator gain circuit 712 nor the milliactuator gain circuit 742 are set to zero, closed-loop multi-actuator track following control system 700 works as a triple-stage actuator (TSA) servo. If either the microactuator gain circuit 712 or the milliactuator gain circuit 742 is set to zero, closed-loop multi-actuator track following control system 700 works as a dual-stage actuator (DSA) servo. If both the microactuator gain circuit 712 and the milliactuator gain circuit 742 are set to zero, closed-loop multi-actuator track following control system 700 works as a single-actuator servo (e.g., a VCM).

Separate mrETF values are defined for each of the actuator types. The microactuator mrETF is defined as the transfer function from the microactuator multi-rate excitation 718 (dmu) to the microactuator multi-rate compensation filter input 721 (uAin); the milliactuator mrETF is defined as the transfer function from the milliactuator multi-rate excitation 748 (dmm) to the milliactuator multi-rate compensation filter input 751 (mAin); and the primary actuator mrETF is defined as the transfer function from the primary actuator multi-rate excitation 778 (dmv) to the primary actuator multi-rate compensation filter input 781 (vcmin).

Closed-loop multi-actuator track following control system 700 is an illustrative example of a control system for multiple actuators, such as a primary actuator and at least one fine actuator (e.g., milliactuator and/or microactuator). In various examples in accordance with this disclosure, an actuator control system may be configured for controlling a primary actuator and at least one fine actuator. For example, a control system may be configured to control a primary actuator and a milliactuator; a primary actuator and a microactuator; a primary actuator, a milliactuator, and a microactuator (as shown in the example of FIG. 7); a primary actuator, a milliactuator, a microactuator, and one or more additional fine actuators; two or more primary actuators, which may have a shared axis of rotation, or which may be disposed at independent locations around the circumference of disks 16, controlling independent actuator arm assemblies, which may in some examples also include one or more fine actuators on each arm of each actuator arm assembly; or other configurations, in various examples.

In various examples, reference to a milliactuator, a microactuator, or a fine actuator in general may refer to one milliactuator, microactuator, and/or other fine actuator on each actuator arm of an actuator arm assembly controlled by a single primary actuator, and configured for individually controlling each head comprised in and suspended and controlled by the actuator arm assembly. Thus, for example, multi-actuator track following control system 700 may control a single primary actuator that controls an actuator arm assembly, and may control one milliactuator and/or one microactuator on each actuator arm of the actuator arm assembly and controlling each head of the actuator arm assembly.

Thus, multi-actuator track following control system 700 comprises at least one multi-rate notch filter, in that it comprises a primary actuator multi-rate notch filter 782, and at least one fine actuator multi-rate notch filter, where the at least one fine actuator multi-rate notch filter comprises a milliactuator multi-rate notch filter 752 and a microactuator multi-rate notch filter 722, in this example. Outputting the multi-rate excitation may comprise outputting a primary actuator multi-rate excitation 778 to a primary actuator control subsystem 771 of multi-actuator track following control system 700, that comprises the primary actuator multi-rate notch filter 782; and outputting at least one fine actuator multi-rate excitation, e.g., actuator multi-rate excitations 751, 721, to at least one fine actuator control subsystem of the closed-loop multi-actuator track following control system 700, e.g., milliactuator control subsystem 741 and microactuator control subsystem 711, which comprise the at least one fine actuator multi-rate notch filter, e.g., multi-rate compensation filter 752 and multi-rate compensation filter 722, respectively.

Detecting the frequency response of the actuator mechanism in response to the multi-rate excitation may comprise detecting a frequency response of a primary actuator 791, and detecting a frequency response of at least one fine actuator, e.g., milliactuator 761 and microactuator 731. For example, as in the example of FIG. 7, multi-actuator track following control system 700 may detect the frequency response of multi-actuator track following control system 700 and actuators 791, 761, 731 in response to a multi-rate excitation. This may comprise multi-actuator track following control system 700 detecting a frequency response of primary actuator 791 in response to the primary actuator multi-rate excitation 778; detecting a frequency response of milliactuator 761 in response to the milliactuator multi-rate excitation 748; and detecting a frequency response of microactuator 731 in response to the microactuator multi-rate excitation 718.

Control circuitry 22, or multi-actuator track following control system 700 thereof, may calibrate the at least one multi-rate notch filter of multi-actuator track following control system 700, based at least in part on the detected frequency response of the actuator mechanism, i.e., the one or more actuators of the system, in this example, primary actuator 791, milliactuator 761, and microactuator 731. This may comprise multi-actuator track following control system 700 calibrating the primary actuator multi-rate notch filter 782 of multi-actuator track following control system 700 based at least in part on the detected frequency response of the primary actuator 791, and calibrating the at least one fine actuator multi-rate notch filter based at least in part on the detected frequency response of the at least one fine actuator, such as by calibrating the milliactuator multi-rate notch filter 752 based at least in part on the detected frequency response of milliactuator 761, and/or calibrating the microactuator multi-rate notch filter 722 based at least in part on the detected frequency response of microactuator 731, in the example of FIG. 7. Calibrating the at least one multi-rate notch filter of the actuator mechanism control system, based at least in part on the detected frequency response of the actuator mechanism, may thus comprise calibrating the primary actuator multi-rate notch filter 782 of multi-actuator track following control system 700 based at least in part on the detected frequency response of the primary actuator 791; calibrating the milliactuator multi-rate notch filter 752 based at least in part on the detected frequency response of the milliactuator 761; and calibrating the microactuator multi-rate notch filter 722 based at least in part on the detected frequency response of the microactuator 731, in some examples. The calibrations may be based at least in part on the frequency responses of the respective actuators 791, 761, 731 as detected via feedback through state estimator 798, as shown in FIG. 7, in this example. Outputting the multi-rate excitation may comprise multi-actuator track following control system 700 outputting a primary actuator multi-rate excitation 778 to primary actuator control subsystem 771, which comprises primary actuator multi-rate notch filter 782; outputting a milliactuator multi-rate excitation 752 to milliactuator control subsystem 741, which comprises the milliactuator multi-rate notch filter 752; and outputting a microactuator multi-rate excitation 718 to a microactuator control subsystem 711, which comprises the microactuator multi-rate notch filter 722.

In the example of FIG. 7, the primary actuator control subsystem 771, the milliactuator control subsystem 741, and the microactuator control subsystem 711 share a common input, in the form of the tracking error output 706 by the summation module 704, based on the target signal 701 corrected by the state estimator feedback 799. Primary actuator control subsystem 771, milliactuator control subsystem 741, and microactuator control subsystem 711 thereby form a coupled system, in this example. Thus, in this example, primary actuator control subsystem 771 and the at least one fine actuator control subsystem 741, 711 share a common input, in the form of the tracking error output 706. In other examples, the primary actuator control subsystem 771, the milliactuator control subsystem 741, and the microactuator control subsystem 711 may be decoupled, and have decoupled inputs, as described below.

Figure 8:
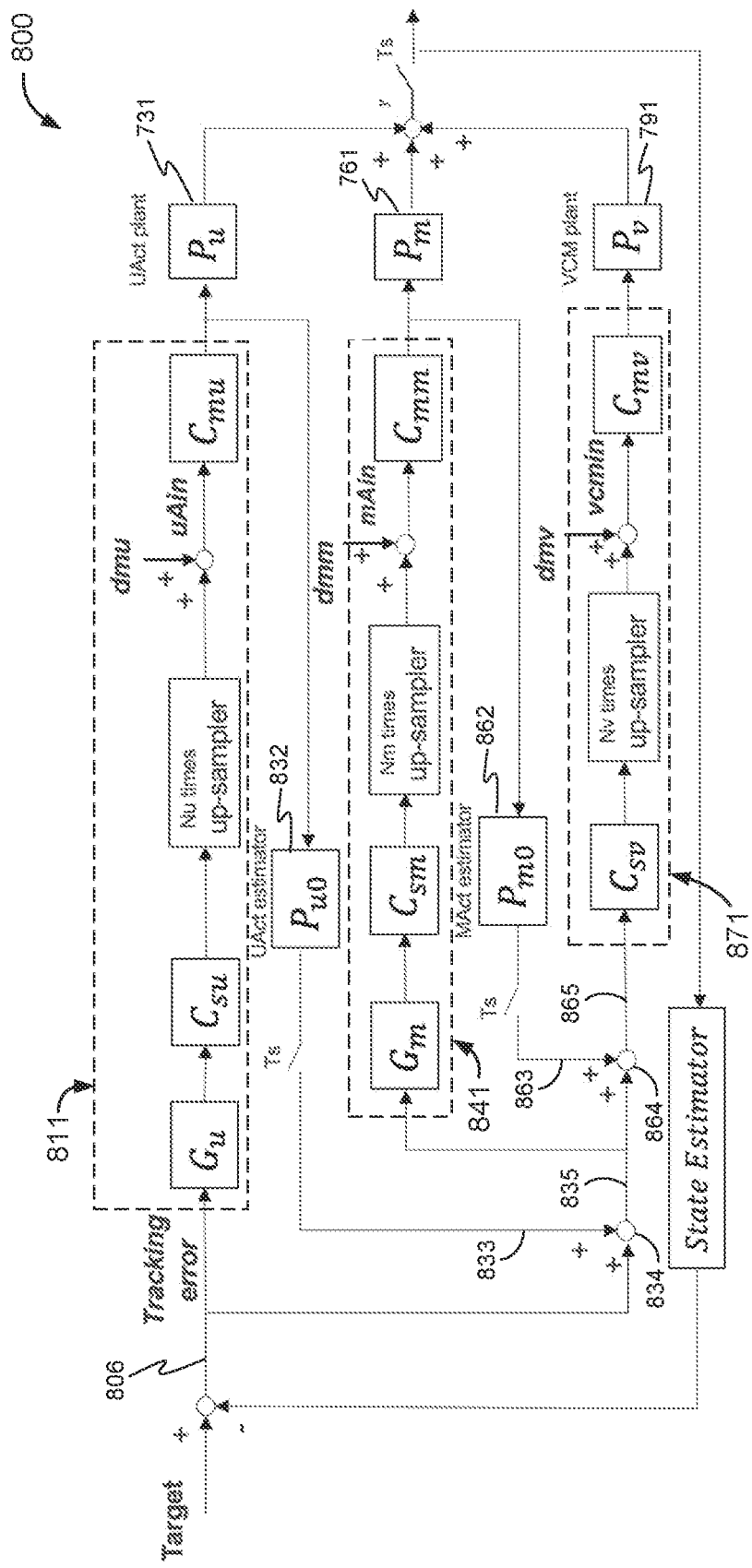
FIG. 8 illustrates a decoupled closed-loop multi-actuator track following control system, in accordance with aspects of the present disclosure.

FIG. 8 illustrates a decoupled closed-loop multi-actuator track following control system 800, in accordance with aspects of the present disclosure. Multi-actuator track following control system 800 comprises much of the same configuration and many of the same elements as multi-actuator track following control system 700 of FIG. 7, along with additional configuration and elements, as shown in FIG. 8 and as described herein. Whereas in the example of FIG. 7, the primary actuator control subsystem 771, the milliactuator control subsystem 741, and the microactuator control subsystem 711 are coupled and share a common input in the form of the tracking error output 706, in the example of FIG. 8, the various actuator control systems 871, 841, 811 are decoupled, and have different inputs.

In particular, an output of the microactuator control subsystem 811 is coupled to a microactuator estimator 832, which estimates or emulates a response from microactuator 731, and is coupled to an input to the milliactuator control subsystem 841, by way of a summation module 834 which sums the tracking error output 806 and the emulation output 833 of microactuator estimator 832. The input to milliactuator control subsystem 841 thus incorporates error tracking 806 of the recent performance of the entire multi-actuator system, as well as the most recent or roughly simultaneous mrETF-based control signal for microactuator 731. Analogously, an output of the milliactuator control subsystem 841 is coupled to a milliactuator estimator 862 which is coupled to an input to the primary actuator control subsystem 871, by way of a summation module 864 that sums the emulation output 863 of microactuator estimator 832, and the summation output 835 of the summation module 834 which sums the tracking error output 806 and the emulation output 833 of microactuator estimator 832. The input to primary actuator control subsystem 871 thus incorporates error tracking of the recent performance of the entire multi-actuator system, as well as the most recent or roughly simultaneous mrETF-based control signals for both the microactuator 731 and the milliactuator 761.

Milliactuator control subsystem 841 thus controls milliactuator 761 based in part on an emulation of microactuator 731, and primary actuator control system 871 controls primary actuator 791 based in part on emulations of both microactuator 731 and milliactuator 761. In various other examples generally, any two or more actuator control systems may be decoupled, and the output of at least one fine actuator control subsystem may be coupled to a fine actuator estimator, which may be coupled to an input to at least one further fine actuator control subsystem, and to the primary actuator control subsystem.

Figure 9:
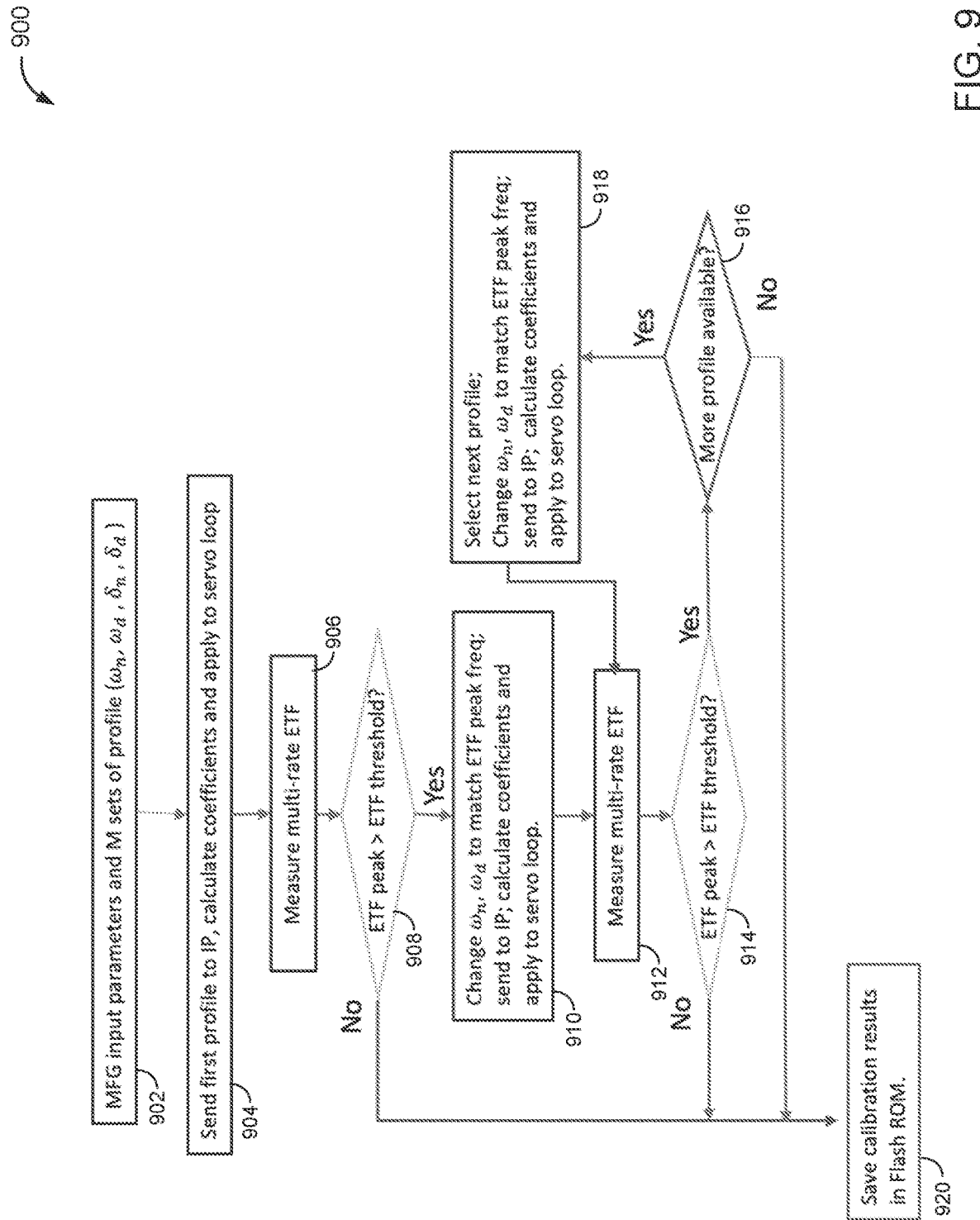
FIG. 9 illustrates a flowchart for a method for calibrating a notch filter based on a response of the actuator system to a multi-rate excitation and a stimulated mrETF, in accordance with aspects of the present disclosure.

FIG. 9 illustrates a flowchart for a method 900 for calibrating a notch filter based on a response of the actuator system to a multi-rate excitation and a stimulated mrETF, in accordance with aspects of the present disclosure. One or more processing devices, such as may be comprised in control circuitry 22 and/or closed-loop multi-actuator track following control systems 700 and/or 800 of FIGS. 7 and 8, may perform, execute, and/or embody method 900, in various examples. The parameters of the multi-rate notch filter may comprise one or more frequencies, e.g., $\omega_n$ and $\omega_d$, associated with a frequency band of the multi-rate notch filter, and one or more damping ratios, e.g., $\delta_n$ and $\delta_d$, of at least one of one or more zeroes and one or more poles of the multi-rate notch filter. In this example, frequencies $\omega_n$ and $\omega_d$ define the frequency band of the notch, and the damping ratios $\delta_n$ and $\delta_d$ define the damping ratio of the zeros and poles. The parameters of the notch filter in continuous time are thus defined by the frequency and damping ratio parameters $\omega_n$, $\omega_d$, $\delta_n$, $\delta_d$ in this example. An actuator control subsystem of control circuitry 22 may calculate notch coefficients by discretization.

Method 900 comprises receiving, by one or more processing devices, parameters of a multi-rate notch filter (902); determining, by the one or more processing devices, coefficients for the multi-rate notch filter, based at least in part on the parameters of the multi-rate notch filter, and applying, by the one or more processing devices, the coefficients to a servo control loop (904); measuring, by the one or more processing devices, a multi-rate error rejection transfer function (906); determining, by the one or more processing devices, whether a peak of the multi-rate error rejection transfer function is greater than a multi-rate error rejection transfer function threshold (908); modifying, by the one or more processing devices, responsively to determining that the peak of the multi-rate error rejection transfer function is not greater than a multi-rate error rejection transfer function threshold, the parameters of the multi-rate notch filter based at least in part on the peak of the multi-rate error rejection transfer function, thereby modifying the peak of the multi-rate error rejection transfer function to be not greater than the multi-rate error rejection transfer function threshold (910); repeating a measuring, by the one or more processing devices, of a multi-rate error rejection transfer function, after the modifying of the parameters (912); repeating a determining whether a peak of the multi-rate error rejection transfer function is greater than a multi-rate error rejection transfer function threshold (914); determining, by the one or more processing devices, responsively to determining that the peak of the multi-rate error rejection transfer function is not greater than a multi-rate error rejection transfer function threshold, whether more profiles are available (916); selecting a new profile providing different damping ratios $\delta_n$ and/or $\delta_d$, which may be smaller $\delta_n$ and/or larger $\delta_d$ from the damping ratios $\delta_n$ and $\delta_d$ set previously, and repeating a modifying of the parameters (918), before repeating the measuring of a multi-rate error rejection transfer function (912); and storing, by the one or more processing devices, responsively to the peak of the multi-rate error rejection transfer function being not greater than the multi-rate error rejection transfer function threshold (or responsively to not having more profiles available), the modified parameters of the multi-rate notch filter (920). One or more processing devices of a multi-actuator track following control system may thus calibrate a multi-rate notch filter with regard to mrETF, in various examples.

Figure 10:
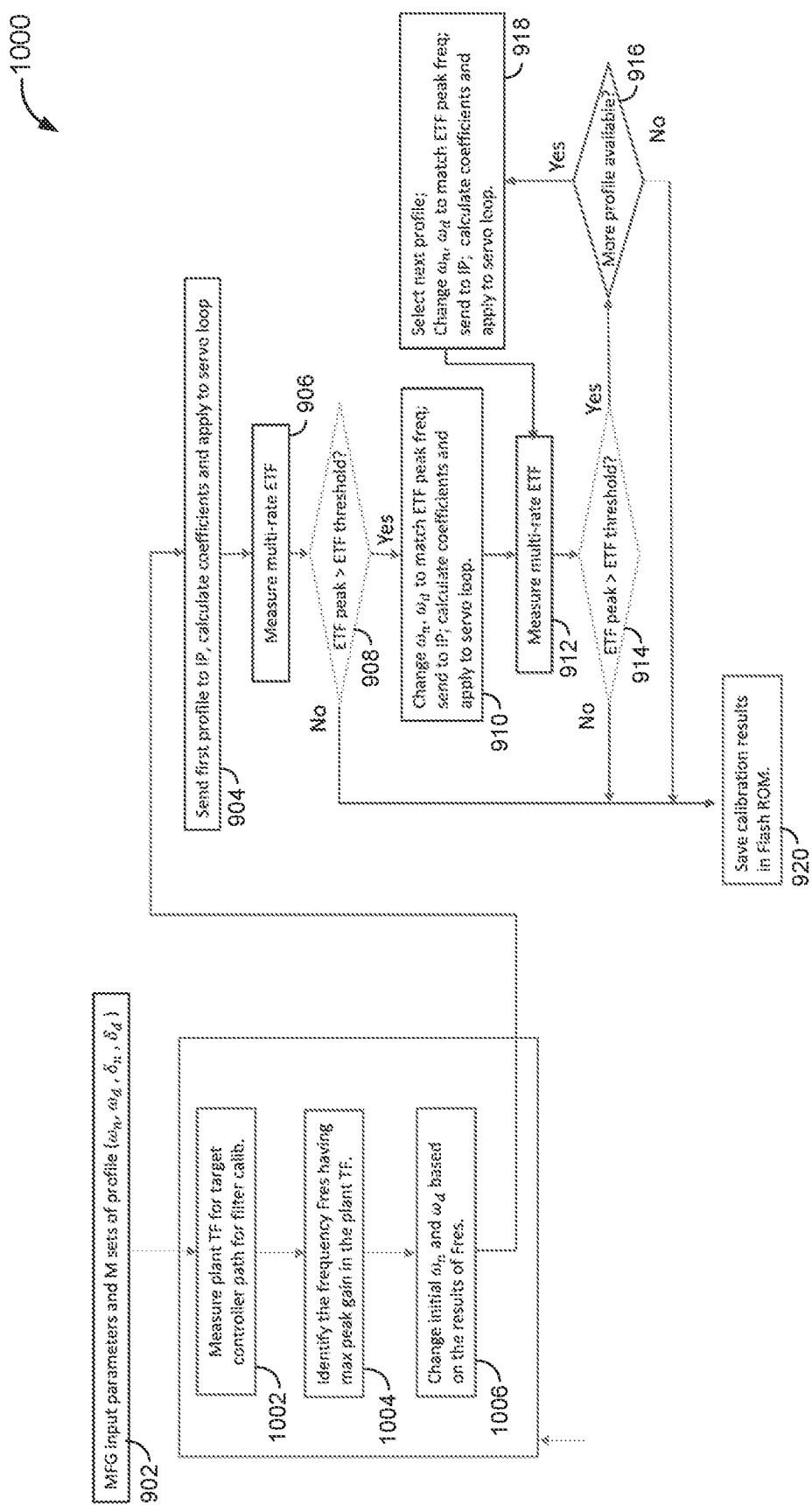
FIG. 10 illustrates a flowchart for another method for calibrating a notch filter based on stimulated mrETF, in accordance with aspects of the present disclosure.

FIG. 10 illustrates a flowchart for another method 1000 for calibrating a notch filter based on stimulated mrETF, in accordance with aspects of the present disclosure. Method 1000 of FIG. 10 is analogous to and expands on method 900 of FIG. 9, and comprises all the subject matter of method 900 as shown in FIG. 9 and described above, plus additional elements. As in method 900, in the example of FIG. 10, frequencies $\omega_n$ and $\omega_d$ may define the frequency band of the notch, and the damping ratios $\delta_n$ and $\delta_d$ define the damping ratio of the zeros and poles. As in the example of FIG. 9, the parameters of the notch filter in continuous time are defined by frequency and damping ratio parameters $\omega_n$, $\omega_d$, $\delta_n$, $\delta_d$. An actuator control subsystem of control circuitry 22 may calculate notch coefficients including by discretization. Method 1000 also adds a process to determine information regarding accurate resonance frequency early in the notch filter calibration process. This may overcome a lack of prior knowledge of where the resonance frequencies are, including if a first notch filter profile is beyond a certain width and depth relative to the resonance, in some examples.

In particular, method 1000 of FIG. 10 expands on method 900 of FIG. 9 to further comprise: determining a plant target frequency for a target controller path for filter calibration (1002); identifying a resonance frequency having a maximum peak gain in the plant target frequency (1004); and modifying one or more frequencies comprised in the parameters that are associated with a frequency band of the multi-rate notch filter, prior to determining the coefficients for the multi-rate notch filter based at least in part on the parameters of the multi-rate notch filter (1006). One or more processing devices of a multi-actuator track following control system may thus calibrate a multi-rate notch filter with regard to mrETF, including in examples in which the notch filter parameters are not well-characterized prior to initiating the calibration process.

In another particular illustrative example, which has been subjected to experimental testing and verification, a microactuator control subsystem of control circuitry 22 for controlling a microactuator of a triple-stage actuator (TSA) may apply narrow notch filter for a microactuator yaw mode, and the microactuator notch filter may be designed with design goals for a −40 decibel (dB) flat gain reduction in the notch filter calibration range from 54 kHz to 62 kHz. The prepared notch filter candidate to apply for customization may have 20 dB more gain reduction at the target frequency, and a width of 5500 hertz (Hz) at a 10 dB gain reduction. The microactuator control subsystem may perform servo ETF verification using yaw frequency boundary samples. In testing, the TSA mrETF target to tracking error was improved from 0.25 dB to 0.75 dB in frequencies below 10 kHz, due to calibration in accordance with examples of this disclosure. Implementations of this disclosure may also reduce non-repeatable runout (NRRO) error, among other advantages.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position one or more heads proximate to one or more disk surfaces of the one or more disks; and
   one or more processing devices, comprising an actuator mechanism control system configured for controlling the actuator mechanism, and
   wherein the one or more processing devices are configured to:
   apply coefficients for a multi-rate notch filter to a servo control loop;
   measure a multi-rate error rejection transfer function;
   determine whether a peak of the multi-rate error rejection transfer function is greater than a multi-rate error rejection transfer function threshold; and
   modify, responsively to determining that the peak of the multi-rate error rejection transfer function is not greater than the multi-rate error rejection transfer function threshold, the parameters of the multi-rate notch filter based at least in part on the peak of the multi-rate error rejection transfer function.

2. The data storage device of claim 1, wherein modifying the parameters of the multi-rate notch filter based at least in part on the peak of the multi-rate error rejection transfer function comprises modifying the peak of the multi-rate error rejection transfer function to be not greater than the multi-rate error rejection transfer function threshold.

3. The data storage device of claim 2, wherein the one or more processing devices are further configured to store, responsively to the peak of the multi-rate error rejection transfer function being not greater than the multi-rate error rejection transfer function threshold, the modified parameters of the multi-rate notch filter.

4. The data storage device of claim 1, wherein the one or more processing devices are further configured to:
   receive parameters of the multi-rate notch filter; and
   determine the coefficients for the multi-rate notch filter, based at least in part on the parameters of the multi-rate notch filter, prior to applying the coefficients for the multi-rate notch filter to the servo control loop.

5. The data storage device of claim 1, wherein the parameters of the multi-rate notch filter comprise one or more frequencies associated with a frequency band of the multi-rate notch filter.

6. The data storage device of claim 1, wherein the parameters of the multi-rate notch filter comprise one or more damping ratios of at least one of one or more zeroes and one or more poles of the multi-rate notch filter.

7. The data storage device of claim 1, wherein the one or more processing devices are further configured to:
determine a plant target frequency for a target controller path for filter calibration.

8. The data storage device of claim 7, wherein the one or more processing devices are further configured to:
identify a resonance frequency having a maximum peak gain in the plant target frequency.

9. The data storage device of claim 8, wherein the one or more processing devices are further configured to:
modify one or more frequencies comprised in the parameters that are associated with a frequency band of the multi-rate notch filter, prior to determining the coefficients for the multi-rate notch filter based at least in part on the parameters of the multi-rate notch filter.

10. A method comprising:
applying, by the one or more processing devices, coefficients for a multi-rate notch filter to a servo control loop;
measuring, by the one or more processing devices, a multi-rate error rejection transfer function;
determining, by the one or more processing devices, whether a peak of the multi-rate error rejection transfer function is greater than a multi-rate error rejection transfer function threshold; and
modifying, by the one or more processing devices, responsively to determining that the peak of the multi-rate error rejection transfer function is not greater than a multi-rate error rejection transfer function threshold, the parameters of the multi-rate notch filter based at least in part on the peak of the multi-rate error rejection transfer function.

11. The method of claim 10, wherein modifying the parameters of the multi-rate notch filter based at least in part on the peak of the multi-rate error rejection transfer function comprises modifying the peak of the multi-rate error rejection transfer function to be not greater than the multi-rate error rejection transfer function threshold, the method further comprising:
storing, responsively to the peak of the multi-rate error rejection transfer function being not greater than the multi-rate error rejection transfer function threshold, the modified parameters of the multi-rate notch filter.

12. The method of claim 10, further comprising:
receiving parameters of the multi-rate notch filter;
determining the coefficients for the multi-rate notch filter, based at least in part on the parameters of the multi-rate notch filter, prior to applying the coefficients for the multi-rate notch filter to the servo control loop.

13. The method of claim 10, wherein the parameters of a multi-rate notch filter comprise one or more frequencies associated with a frequency band of the multi-rate notch filter, and one or more damping ratios of at least one of one or more zeroes and one or more poles of the multi-rate notch filter.

14. The method of claim 10, further comprising:
determining a plant target frequency for a target controller path for filter calibration.

15. The method of claim 14, further comprising:
identifying a resonance frequency having a maximum peak gain in the plant target frequency.

16. The method of claim 15, further comprising:
modifying one or more frequencies comprised in the parameters that are associated with a frequency band of the multi-rate notch filter, prior to determining the coefficients for the multi-rate notch filter based at least in part on the parameters of the multi-rate notch filter.

17. One or more processing devices comprising:
means for receiving parameters of a multi-rate notch filter;
means for determining coefficients for the multi-rate notch filter, based at least in part on the parameters of the multi-rate notch filter;
means for applying the coefficients for the multi-rate notch filter to a servo control loop;
means for measuring a multi-rate error rejection transfer function;
means for determining whether a peak of the multi-rate error rejection transfer function is greater than a multi-rate error rejection transfer function threshold; and
means for modifying, responsively to determining that the peak of the multi-rate error rejection transfer function is not greater than a multi-rate error rejection transfer function threshold, the parameters of the multi-rate notch filter based at least in part on the peak of the multi-rate error rejection transfer function, thereby modifying the peak of the multi-rate error rejection transfer function to be not greater than the multi-rate error rejection transfer function threshold.

18. The one or more processing devices of claim 17, further comprising:
means for storing, responsively to the peak of the multi-rate error rejection transfer function being not greater than the multi-rate error rejection transfer function threshold, the modified parameters of the multi-rate notch filter.

19. The one or more processing devices of claim 17, wherein the parameters of the multi-rate notch filter comprise one or more frequencies associated with a frequency band of the multi-rate notch filter, and one or more damping ratios of at least one of one or more zeroes and one or more poles of the multi-rate notch filter.

20. The one or more processing devices of claim 17, further comprising:
means for determining a plant target frequency for a target controller path for filter calibration;
means for identifying a resonance frequency having a maximum peak gain in the plant target frequency; and
means for modifying one or more frequencies comprised in the parameters that are associated with a frequency band of the multi-rate notch filter, prior to determining the coefficients for the multi-rate notch filter based at least in part on the parameters of the multi-rate notch filter.

* * * * *